United States Patent [19]

Takematsu

[11] 4,387,976
[45] Jun. 14, 1983

[54] LIGHT QUANTITY INDICATING CIRCUIT FOR AN ELECTRONIC FLASH DEVICE

[76] Inventor: Yoshiyuki Takematsu, 38-1 Komaba 1 Chome, Meguro-ku, Tokyo, Japan

[21] Appl. No.: 276,818

[22] Filed: Jun. 24, 1981

[30] Foreign Application Priority Data

Jun. 25, 1980 [JP] Japan .................... 55-086264

[51] Int. Cl.³ .................... G03B 7/16; G03B 15/03
[52] U.S. Cl. .................... 354/33; 354/128; 354/145
[58] Field of Search ............ 354/33, 60 F, 128, 129, 354/139, 149, 145

[56] References Cited

U.S. PATENT DOCUMENTS

| | | | |
|---|---|---|---|
| 4,035,814 | 7/1977 | Nobusawa | 354/33 |
| 4,192,590 | 3/1980 | Kitaura | 354/33 |
| 4,256,391 | 3/1981 | Kitaura | 354/33 |
| 4,274,723 | 6/1981 | Igarashi | 354/33 |
| 4,306,176 | 12/1981 | Kaneko et al. | 354/33 |

Primary Examiner—Russell E. Adams
Attorney, Agent, or Firm—Fleit, Jacobson & Cohn

[57] ABSTRACT

The present invention provides an electronic flash device which has a function of light measuring device. The electronic flash device comprises, substantially, a flash unit for generating flash light, a flash control unit for controlling the flash light generated from said flash unit and a light measuring unit for measuring another light source. The flash unit comprises electric power supplying means for supplying electric power, electric energy storing means for storing the electric energy supplied from said electric energy storing means, flash light generating means for converting the electric energy stored in said electric energy storing means to an optical energy, and said flash control unit comprises, substantially, first light receiving means for receiving a reflecting light, flash light quantity detecting means for detecting flash light quantity, means for indicating light exposure quantity, and flash light quantity control means. The light measuring unit comprises, substantially, second light receiving means for receiving the another light source such as another flash device, and portions of circuits of said flash unit and flash control unit. The flash device of the present invention can be employed as an independent light measuring device and is convenient to adjust the photographing distance and a diaphragm of a camera in photographing.

17 Claims, 1 Drawing Figure

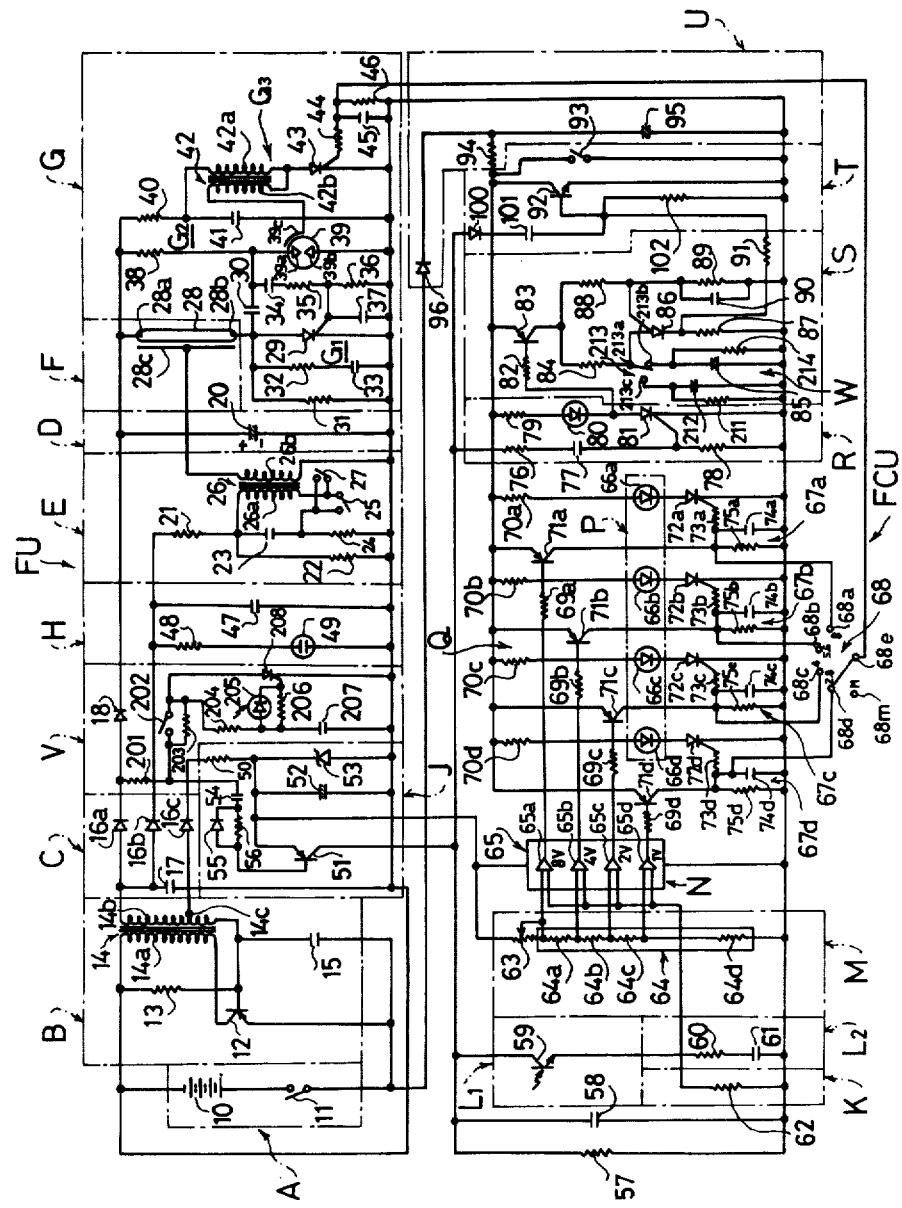

LIGHT QUANTITY INDICATING CIRCUIT FOR AN ELECTRONIC FLASH DEVICE

FIELD OF THE INVENTION

The present invention relates in an electronic flash device, and more particularly to an electronic flash device which is used in an optical device such as a camera.

BACKGROUND OF THE INVENTION

In recent years, a flash device has been widely employed to an optical apparatus such as, for example, a camera. Particularly when the flash device is employed in the photographing, the light exposure is the most important component. In an automatic light adjusting device which is employed in the photographing the flash light is ceased, when the reflected light from an object to be photographed attains a predetermined value.

The reflected light from the object to be photographed is, however, few in case that color of the object is black or in case that distance from the object to be photographed to the flash device is long, and the reflected light quantity, the automatic light adjusting device was inactivated, and thereby a photographer could not judge easily the distance between the object to be photographed and the flash device or to adjust the diaphragm. To contrary, when the color of the object to be photographed is white, the reflected light quantity becomes much or the distance from the object to the flash device is very short, the reflected light quantity becomes large, and, accordingly, the automatic light adjusting device does not activate correctly. It is also impossible for the photographer to alternate the distance or to adjust the diaphragm.

SUMMARY OF THE INVENTION

It is, accordingly, an object of the present invention to provide a high performance flash device which is able to confirm that the reflected light is controlled such that an exposure light becomes to the preset value by means of detecting the reflected light which is produced by the flashing portion and is reflected from an object to be photographed, as well as is convenient to use.

It is another important object of the present invention to provide an electric flash device which operates as an independent light measuring device for measuring light from another light source such as another flash device.

According to the present invention there is provided an electronic flash device comprising, in combination, a flash unit having electric power supplying means including a direct current voltage power source, means for boosting voltage of said direct current power source and for storing electric energy, flash light generating member including a flash tube generating flash light, trigger signal generating member, and flash stopping means for stopping flash of said flash light generating member when flash light quantity of said flash light attains to a predetermined value, a flash control unit having first light receiving means for receiving a reflecting light which is produced from said flash tube and is reflected from an object to be photographed, flash light quantity detecting means for detecting flash light quantity of said light by means of comparing an electric value obtained by integrating signal of said light receiving means with a reference voltage, light quantity indicating means for indicating light exposure quantity in response to a plurality of signals of said flash light quantity detecting means, and flash light quantity control means for controlling said flash light quantity of said flash light, and a light measuring unit including a second light receiving means for receiving a light from another light source and generating a signal and actuating said means for indicating light exposure quantity, actuation stopping means for stopping the actuation when said second light receiving means received the light from said flash light generating member of said flash unit, actuation retaining means for retaining the actuation of said light quantity control means, said light quantity indicating means of said flash light control unit, and voltage generating means of said flash light control unit.

BRIEF DESCRIPTION OF THE DRAWING

The other objects and features of the present invention will be best understood by the description of the preferred embodiment when read in conjunction with the accompanying drawing.

FIGURE is an electronic diagram of an electric flash device of the present invention.

DESCRIPTION OF THE PREFERRED EMBODIMENT

Referring to the drawing, there is shown an electric flash device according to the present invention. The electric flash device has a flash unit FU for generating flash light, generated from said flash unit FU, and light quantity measuring means for measuring the quantity of light illuminated by another light source which is independent from said flash unit FU. The light quantity measuring means comprises a light receiving circuit in the flash unit FU and a timing setting circuit in the flash control unit FCU.

The flash unit FU comprises, substantially, power supplying means for supplying electric power, electrical energy storing means for storing electrical energy supplied from said electric power supplying means, flash light generating means for converting the electric energy stored in said electric energy storing means to light energy, trigger signal generating means for triggering said flash light generating means, and flash light control means for controlling flash light quantity.

The electric power supplying means comprises, substantially, direct current power source including a low voltage battery and a power source switch connected to the battery, a voltage converter circuit B for converting and boosting a direct current voltage to an alternating current voltage, a rectifier circuit C including at least one diode.

The electric energy storing means comprises an electric energy storing circuit D for storing an electric charge and for supplying the electric energy to the flash light generating means. The flash light generating means comprises a flash tube circuit F for generating flash light. The trigger signal generating means comprises a trigger signal generating circuit E for actuating the flash tube circuit F. The flash light control means comprises a quench controlling circuit G for controlling flashing operation of said flash tube circuit F, an indicating and trigger control circuit H for indicating that an electric charge is stored on said electric energy storing circuit D at a predetermined value and for controlling activation of said trigger signal generating circuit E, and a voltage generating circuit J activated by an activation signal and generating a voltage signal.

The flash control unit FCU comprises, substantially, a first light receiving circuit $L_1$ for sensing a flash light generated from the flash tube circuit F and thereafter generated from an object to be photographed (not shown in the drawing) and conducting in response to the reflected light quantity or the light quantity of the light from another light source, an integration circuit $L_2$ in which the charging time interval changes corresponding to conduction of the first light receiving circuit $L_1$, an integration reset circuit K for resetting the integration circuit $L_2$, a reference voltage setting circuit M for setting a plurality of reference voltage, an exposure light quantity detecting circuit in the form of a comparator circuit N receiving a voltage signal and a reference voltage signal of the reference voltage setting circuit M, an exposure indicating circuit P illuminating in response to an output of the comparator circuit N, an indication controlling circuit Q activated by a voltage signal supplied from the voltage generating circuit J, an actuation confirming circuit R actuating and enabling the indication controlling circuit Q to fire when the signal is supplied from the voltage generating circuit J of the flash unit FU, a timer circuit S for setting time interval of said indicating circuit P and an illumination resetting circuit T for resetting the illumination of the indicating members.

The voltage converter circuit B has, substantially, an oscillator circuit and is connected to the battery 10 by way of the power source switch 11. The rectifier circuit C is connected to an output side of the voltage converter circuit B. The electric charge storing circuit D is connected to the voltage converter circuit B by way of the rectifier circuit C. The trigger signal generating circuit E activates when a synchronous switch synchronizing with a camera shutter or a test button switch is placed in an ON state. The flash tube circuit F has a flash tube and is connected to the electric energy storing circuit. The quench control circuit G is connected to a thyristor 29 by way of a commutation capacitor 30. The trigger control circuit H is activated by the illumination and controls the trigger signal generating circuit E. The voltage generating circuit J is activated by an input signal from the trigger signal generating circuit E and applies the voltage to the first light receiving circuit $L_1$, the integration circuit $L_2$, the reference voltage setting circuit M, the comparator circuit N, the circuit R and the timer circuit S.

In the flash light control unit FCU, the discharging circuit K operates after a predetermined time interval when the flash tube flashes and makes the integration circuit $L_2$ OFF. The reference voltage setting circuit M comprises, substantially, a plurality of voltage dividing resistor elements. The comparator circuit N comprises a plurality of comparators, each of which is activated by different operation voltages such as, for example, 8 volts, 4 volts, 2 volts and 1 volt. The comparators are, respectively, connected to the integration circuit $L_2$, and the reference voltage setting circuit M. The indicating circuit P has a plurality of indicating elements, and the indication controlling member Q comprises a plurality of switching circuits connected to the indicating lamps which are, respectively, operated by the comparator elements. The switching circuits of the indication controlling member Q are connected to the indicating lamps, and is connected to the quench controlling circuit G of the flash unit FU by way of a changeover switch and the indication controlling circuit Q is reset by the actuating signal of the quench controlling circuit G. The actuation confirming circuit R is connected to an indicating element to illuminate the indicating element in response to the voltage signal from the voltage generating circuit J of the flash unit FU in activating of the flash unit FU. The timer circuit S and an indication reset circuit T are, respectively, connected to the indicating circuit P, the indication controlling circuit Q and the actuation indicating circuit R in parallel relationship. The timer circuit S is activated by a signal from the voltage signal from the voltage generating circuit J. The indication reset circuit T is activated by a time up signal from the timer circuit S and extinguishes the indicating circuit P and the indicating element. A smoothing circuit U is connected to the direct current power source circuit A. The quench detecting circuit is connected to the quench controlling circuit G.

The light quantity measuring means comprises the voltage generating circuit J, a second light receiving circuit V for controlling the trigger signal generating circuit E and the voltage generating circuit J, the flash control unit FCU which comprises the first light receiving circuit $L_1$, the integration circuit $L_2$, the integration reset circuit K, a reference voltage setting circuit M, the comparator circuit N, the exposure indicating circuit P, the indication controlling circuit Q, the timer circuit S, the indication resetting circuit T, and a timing setting circuit W for setting the timing of the timer circuit S.

In more detail, the direct current power source circuit A comprises a low voltage battery 10 and a power source switch 11. The voltage converter circuit B comprises, substantially, an oscillator circuit. Namely, the voltage converter circuit B includes a switch element in the form of a transistor 12 of which an emitter electrode is connected to a positive terminal of the battery by way of the power source switch 11, an oscillating transformer 14 including a primary coil 14a connected to the battery 10 by way of the collector-emitter path of the transistor 12 and the power source switch 11, a resistor 13 between a positive terminal and a base electrode of the transistor 12, and an oscillating capacitor 15 connected between the emitter electrode and the base electrode of the transistor 12. One terminal of a secondary winding 14b is connected to the base electrode of the transistor 12. The rectifier circuit C comprises diodes 16a, 16b, 16c and a capacitor 17. Anode electrodes of the diodes 16a and 16b are connected to a terminal of the secondary coil 14b, and an anode electrode of the diode 16c is connected to a tap 14c of the secondary coil 14b. The capacitor 17 is connected between the secondary coil 14b and the negative terminal of the battery 10.

The electric energy storing circuit D has a main storage capacitor 20 which is connected to the diode 16a of the rectifier circuit D and the negative terminal of the battery 10. The trigger signal generating circuit E comprises resistors 21, 22 and 24, a first trigger capacitor 23 and a first triggering transformer 26. Resistors 21 and 24 and the trigger capacitor 23 are connected between the diode 16b and the negative terminal of the battery 10, and the resistor 22 is connected to the trigger capacitor 23 and the resistor 24 in parallel relationship in order to be used as a by-passing resistor of the trigger capacitor 23. A primary coil 26a of the triggering transformer 26 is connected in parallel to the trigger capacitor 26 by way of a synchronous switch 25 and a test button switch 27. A flash tube circuit F has a flash tube 28 of which main current conducting electrodes 28a is connected to the diode 16a of the rectifier circuit C and a trigger electrode 28c is connected to the secondary coil 26b of the first triggering transformer 26.

The quench controlling circuit G comprises a switching circuit G₁ controlling the flash tube circuit F, a quenching circuit G₂ for controlling the switching circuit G₁, and a quenching signal generating circuit G₃ for triggering the quench tube circuit G₂. The switching circuit G₁ comprises a first switching element in the form of a thyristor 29, a commutation resistor 31, a resistor 32, capacitors 33, 34 and 37, and resistors 35 and 36 and is connected as shown. The quenching circuit G₂ includes a protecting resistor 38 and a quench tube 39 having a pair of main current conducting electrodes 39a and 39b and a trigger electrode 39c. The quench tube 39 is also connected to both electrodes 28a and 28b of the flash tube 28 and the main storage capacitor 20. The quench controlling circuit G₃ includes a protecting resistor 40, a second trigger capacitor 41 and a second triggering transformer 42. The trigger capacitor 41 is connected between the diode 16a of the rectifier circuit C and the negative terminal of the battery 10 of the direct current power source circuit A. A primary coil 42a of the second triggering transformer 42 is connected to the trigger capacitor 41 by way of a second thyristor 43. Connected to a gate electrode of the thyristor 43 is a protecting resistor 44, a capacitor 45 for absorbing the noise, and a resistor 46.

In a trigger controlling and indicating circuit H, an indicating element in the form of a neon glow lamp 49 is connected to the smoothing capacitor 47 by way of a protecting resistor 48. The voltage generating circuit J comprises a switch element in the form of a transistor 51 of which an emitter electrode is connected to the diode 16a of the rectifier circuit C, a constant voltage generating element in the form of a Zener diode 53 connected between the diode 16c of the rectifier circuit C and the negative terminal of the battery 10, and a smoothing capacitor 52. A base electrode of the transistor 51 is connected to the diode 16a by way of a bias controlling member which comprises a diode 55, a resistor 56 and a capacitor 54. A collector electrode of the transistor 51 is connected to a load resistor 57, a capacitor 58, the first light receiving circuit L₁ and the flash operation confirming and detecting circuit R of the flash control unit FCU.

In the flash control unit FCU, a light sensing element in the form of a phototransistor 59 is connected to a resistor 60 and an integrating capacitor 61, and a resistor 62 is connected to the resistor 60 and the capacitor 61 forming the discharging circuit K. The integration circuit L₂ comprises the resistor 60 and the integrating capacitor 61. The reference voltage setting circuit M has a voltage divider 64 which is connected to the collector electrode of the transistor 51 of the voltage generating circuit J by way of a variable resistor 63. The voltage divider 64 has a plurality of series connected resistor element 64a, 64b, 64c and 64d.

A comparator circuit N comprises a plurality of comparator elements 65a, 65b, 65c and 65d. Each of the comparator elements 65a-65d is set so as to generate the different setting voltage, and is connected to corresponding taps of the resistor elements 64a-64d of the voltage divider 64 and the integration circuit L₂ and the discharging circuit K. Each of light emitting diodes 66a-66d is connected to a corresponding switching control circuits 67a-67d of an indication controlling circuit Q. In the indication controlling circuit Q, each of transistors 69a-69d is connected to the corresponding comparator element of the comparator circuit N by way of resistors 69a-69d. The protecting resistors 70a-70d are connected, respectively, to thyristors 72a-72d by way of the light emitting diodes 66a-66d. A changeover switch 68 is used to change the quantity of the flash light generated from the flash tube 28. The changeover switch 68 comprises a movable contact 68e, a manual operation setting contact 68m and a plurality of stationary contacts 68a, 68b, 68c and 68d. In more detail, the contact 68a corresponds to the F-number 8, the contact 68b is corresponded to F-number 5.6, the contact 68c to F-number 4 and the contact 68d is corresponded to F-number 2.8. The changeover switch 68 is connected to the thyristor 43 by way of a protecting resistor 44. In thus manner, to set the diaphragm of the camera to a predetermined value means that the light quantity of the flash tube 28 is adjusted and thereby the suitable light exposure quantity can be obtained. The transistor 51 is connected to a resistor 76 and a capacitor 77 and a resistor 78, and a thyristor 81 is connected to a protecting resistor 79 by way of a resistor 79. The light emitting diode 80 and the thyristor 81 are connected to a transistor 83 by way of a resistor 82. The transistor 83 is connected to a programmable unijunction transistor 86 by way of a resistor 84 and a resistor 88, and the transistor 86 is connected to an integration capacitor 85 for adjusting delay time, a resistor 87, a resistor 89, a capacitor 90 and a resistor 92. The transistor 86 is connected to a transistor 92 through a protecting resistor 91. The transistor 92 is connected to a diode 100 and a smoothing capacitor 95 by way of a protecting resistor 94, and the diode 100 is connected to the battery 10 by way of the power source switch 11.

In operation, when the power source switch 11 is closed, the voltage converter circuit B activates an oscillating operation, and thereby the high voltage is induced at the secondary coil 14b of the oscillating transformer 14. The boosted alternating current voltage is rectified by the rectifier circuit C, and thereafter electric charge is stored on the main storage capacitor 20. When the main storage capacitor 20 is charged to the predetermined voltage, the neon glow lamp 49 lights indicating that the device is readiness for the flash tube 28 to be fired. Simultaneously, the triggering capacitors 23 and 41 are charged by the high D.C. voltage from the rectifier circuit C. In such conditions, the operation of the flash tube circuit F is initiated by the flash operation of the trigger signal generating circuit E in synchronism with the camera shutter opening operation, enabling flash tube 28 to be flashed.

In more detail, the direct current voltage rectified by the diode 16a of the rectifier circuit C is applied to the main storage capacitor 20, and the charging voltage of the main storage capacitor 20 is gradually increased. With the increment of the main storage capacitor 20, the charging voltage of the capacitor 47 is also increased by the application of the rectified voltage from the diode 16b. A direct current voltage rectified by the diode 16c is applied to the Zener diode 53 of the voltage generating circuit J to produce a constant voltage, and thereby the charging voltage of the capacitor 52 is made constant. The tap 14c of the transformer 14 is provided in order to obtain the relatively low voltage such as about 15 to 20 volts, and the transistor 51 is biased to be nonconductive by the application of positive voltage of the charging voltage of the capacitor 54. In such condition, the charging voltage of the capacitor 52 is always applied to the comparator circuit N of the flash control unit FCU, and therefore the comparator circuit N is set to be operable in any time.

When the flash tube circuit F operates, the electric charge of the capacitor 54 in the voltage generating circuit J is discharged toward the flash tube 28. By the discharge of the capacitor 54, a negative voltage is applied to the base electrode of the transistor 51 to make it conductive. When the transistor 51 is made conductive, a terminal voltage of the capacitor 52 of the voltage generating circuit J is applied to the first light receiving circuit $L_1$, the reference voltage setting circuit M and the actuation confirming circuit R. Under these conditions, the phototransistor 59 of the light receiving circuit $L_1$ senses the reflecting flash light of the flash light produced by the flash tube 28 and becomes conductive in response to the quantity of the reflecting light. By the conduction of the phototransistor 59, electric charge is stored on the integration capacitor 61 of the integrating circuit $L_2$ and thereby the charging voltage of the integration capacitor 61 increases to a predetermined value which corresponds to the quantity of the flash light. The charging voltage of the integration capacitor 61 is applied to the comparator circuit N. On the other hand, the reference voltage setting circuit M produces a plurality of reference voltage to be applied to the comparator circuit N. In this instance, the reference voltage M is set so as to produce the plurality of reference voltages such as, for example, 8 V, 4 V, 2 V and 1 V. The comparator circuit N is comprised by the comparator element 65a activated by operating voltage of 8 V, the element 65b operated at 4 V, the element 65c operated at 2 V and the comparator element 65d operated at 1 V.

When the charging voltage of the integration capacitor 61 attains the predetermined value such as 8 volts, all of the comparator elements 65a, 65b, 65c and 65d are activated and output signals. By these output signals, all of the transistor 71a, 71b, 71c and 71d become conductive. When the transistors 71a–71d become conductive, gate signals are supplied to the thyristors 72a, 72b, 72c and 72d, enabling the thyristors to be conductive. By the conduction of the thyristors 72a–72d of the illumination controlling circuit Q, all of the light emitting diodes 66a, 66b, 66c and 66d light and indicate the light quantity of the flash light generated from the flash tube 28 of the flash tube circuit F. In the same manner, at least one of the light emitting diodes 66a–66d of the indicating circuit P lights and indicating the flash light quantity in accordance with the charging voltage value of the integration capacitor 61 of the integrating circuit $L_2$. Namely, when the charging voltage of the capacitor 61 is 4 volts, the diodes 66b, 66c and 66d light and indicating the corresponding light quantity. When the charging voltage of the capacitor 61 attains to 2 volts the diodes 66c and 66d light and, when the voltage of the capacitor 61 attains to 1 volt, the diode 66d lights and indicating the corresponding light quantity of the flash light produced by the flash tube 28.

Although the indication controlling circuit Q is designed so as to be operated by the output signal of the comparator circuit N in the flash device shown in the drawings, in accordance with the present invention, an external and another indication control unit may be used instead of the indication controlling circuit Q.

In the flash device shown in Figure, when the distance between the object is to be photographed and the flash device is small in photographing, the integrating operation of the integrating circuit $L_2$ is fastened by the resistor 60, and the charging voltage of the integration capacitor 61 is by-passed by the resistor 62 of the integration reset circuit K.

The output signal of the comparator circuit N is also supplied to the quench controlling circuit G by way of the changeover switch 68. The quench controlling circuit G controls the flash timing and the flashing time duration of the flash tube 28 in accordance with the control signal from the comparator circuit N. In more detail, if the movable contact 68e is connected to the stationary contact 68e which corresponds to the element 65d of the comparator circuit N, the output signal of the element 65d is supplied to the quench controlling circuit G when the integrated voltage of the integration capacitor 61 becomes more than at least 1 volt. By the control signal from the comparator circuit N, the thyristor 54 is triggered to be conductive. When the thyristor 43 is turned ON, the electric charge of the second triggering capacitor 41 is discharged by way of the primary coil 42a of the second triggering transformer 42 and the thyristor 43. A high voltage pulse is produced at the secondary coil 42b as a trigger signal of the quench tube 39.

There are, of course, certain criteria that must be met in quench tube 39. To operate effectively, the quench tube 39 must have a low impedance compared with the flash tube 28. The flash tube 28 has a minimum impedance of typically 1,5 to 2 ohms. Thus, the quench tube 39 should have an impedance near 0.1 ohm. To provide such low impedance, the quench tube 39 also should have a low gas pressure and a small electrode spacing. The electrode 39a and 39b must be capable of carrying a very high current for short time. The quench tube 39 must be capable of being triggered rapidly and easily into conduction over the range of voltage change across the flash tube during the flash. The quench tube 39 includes a trigger electrode 39c spaced midway between the two main electrodes 39a and 39b.

By the trigger signal supplied from the triggering transformer 42, the quench tube 39, the quench tube 39 of the quenching circuit $G_2$ is activated to be conductive. When the quench tube 39 becomes conductive, the discharging current from the main storage capacitor 20 of the electric enegy storing circuit D is by-passed by the quench tube 39 to stop the flash operation of the flash tube 28 of the flash tube circuit F, because the internal resistance of the quench tube 39 is smaller than that of the flash tube 28.

When the flash tube 28 stops flashing, the quantity of the flash light becomes zero and the light emitting diode 66d is extinguished because the comparator circuit N ceases the operation. When the distance between the object and the flash unit is very short, the superabundant light is generated from the flash tube 28 in spite of stopping of the flash operation due to the delay of the activation of the quench controlling circuit G. Thus, the phototransistor 59 senses the unnecessary light, and thereby the unnecessary electric charge is stored on the integration capacitor 61. Accordingly, the light emitting diode 66c operates in addition to the diode 66d. In this manner, the comparator circuit N is operated erroneously.

On the other hand, when the photographing distance is very long, the quantity of the reflecting light is minimal, and, therefore, few electric charge is stored on the integration capacitor 61. By the few charge stored on the capacitor 61, the charging voltage of the capacitor 61 becomes less than 1 volt, none of the light emitting diodes operate. In this case, the under exposure is detected and confirmed, since the firing signal is applied to the thyristor 81 of the actuation confirming circuit R from the voltage generating circuit J and thereby the thyristor 81 becomes conductive, and the diode 80 illuminate. When the changeover switch 68 is set to the manual operation, adequate quantity of the flash light can be confirmed if all light emitting diodes 24a–24d, although the control signal is not supplied to the quench controlling circuit G. When the thyristor 81 becomes conductive, the negative electric charge is applied to a base electrode of the transistor 83 of the timer circuit S, the transistor 83 becomes conductive. When the transistor 83 becomes ON, the programmable unijunction transistor 86 also becomes conductive. When the programmable unijunction transistor 86 of the timer circuit S becomes conductive, an ON pulse signal is supplied to a base electrodes of the transistor 92 and the transistor 92 is turned on. By the conduction of the transistor 92, all of the light emitting diodes are reset to be nonoperative.

Additionally, although the timing circuit means of the present embodiment is constructed such that the light emitting diodes 66a–66d and 80 are turned off after the given time interval, it is not always necessary for the light emitting diodes to be made turned off after the given time interval, but may be maintained by the immediately before the next flash operation of the flash tube circuit F. To perform this, it is possible to make the indication controlling circuit Q to be OFF state by the next flash operation in order to maintain the light emitting diodes.

In regard to the light quantity measuring means, the second light receiving circuit V comprises, as is shown in Figure of the drawing, a protecting resistor 201, a setting switch 202, a resistors 203 and 204, a light sensing element in the form of a solar cell 205, a gate resistor 206, a thyristor 208 and a gate capacitor 207. The parallel connected setting switch 202 and the resistor 203 are connected to the diode 16a of the rectifier circuit C by way of the protecting resistor 201, and the protecting resistor 201 is connected to the capacitor 54 of the voltage generating circuit J and to the main storage capacitor 20 by way of a blocking diode 18. The thyristor 208 is connected between a base circuit of the transistor 51 of the voltage generating circuit J and the negative terminal of the battery 10 by way of the resetting switch 202 and the resistor 203. One terminal of the resistor 204 having a high resistance value is connected to the resetting switch 202 and an anode electrode of the thyristor 208. The gate capacitor 207 is connected between the other terminal and a cathode electrode of the thyristor 208. The solar cell 205 and the gate resistor 206 are connected between a gate electrode of the thyristor 208 and a juncture of the resistor 204 and the gate capacitor.

The timer circuit S is provided with the timing setting circuit W. The timing setting circuit W comprises a plurality of timing circuits and a timing changeover switch 213. In more detail, the timing changeover switch 213 has a movable contact 213a connected to the resistor 84 and an anode electrode of the programmable unijunction transistor 86, and a plurality of stationary contacts 213b and 213c. The stationary contact 213b is connected to a first timing circuit including parallel connected to a first integration capacitor 85 and a resistor 214. The stationary contact 213c is connected to a second timing circuit having parallel connected to a second integration capacitor 213 and a resistor 211. The capacitance value of the first integration capacitor 85 is set to be smaller than that of the second integration capacitor 212. As is shown in Figure of the drawing, the indication reset circuit T further comprises a blocking diode 100 of which anode electrode is connected between the positive terminal of the battery 10 and a differential capacitor 101 connected between a cathode electrode of the diode 100 and the base electrode of the transistor 92, a resistor 102 connected to the base-emitter path of the transistor 92, and an illumination resetting switch 93 connected to the collector-emitter path in parallel relation.

The light quantity measuring means operates as follows.

When the power source switch 11 is closed, the voltage converter circuit B activates an oscillating operation, and thereby the high voltage is induced at the secondary coil 14b of the oscillating transformer 14. The boosted alternating current voltage is rectified by the rectifier circuit C, and thereafter electric charge is stored on the main storage capacitor 20 and the capacitor 47. When the main storage capacitor 20 and the capacitor 47 is charged to the predetermined voltage, the neon glow lamp 49 lights indicating that the second light receiving circuit V is readiness for operation. Simultaneously, the triggering capacitors 23 and 41 are charged by the D.C. voltage from the rectifier circuit C. In such condition, when the setting switch 202 is made its ON state, the voltage is applied to the thyristor 208 and, at the same time, electric charge is stored on the trigger capacitor 207. In this case, the over current is avoided to flow through the thyristor 208 by the protecting resistor 201, and the resistor 203 prevents erroneous operation of the thyristor 208 when the high voltage is applied to the thyristor 208 on making the resetting switch 202 ON state. In this case, the charging voltage of the trigger capacitor is about 0.3 volts since the resistor has the high resistance value, and the actuation voltage of the thyristor 208 is about 0.7 volts. Accordingly, the ON operation of the thyristor 208 is improved because a bias voltage of 0.3 volts is applied to the thyristor 208 of which the actuation voltage is 0.7 volts. Under these conditions, the solar cell 205 produces an electromotive force when the light is injected to the solar cell 205 from another light source in the form of another flash device, excepting the flash tube 28. The voltage generated from the solar cell 205 is applied to the thyristor 208 of the second light receiving circuit V, and thereby the thyristor 208 is made conductive. When the thyristor 208 of the second light receiving circuit V becomes conductive, the electric charge of the capacitor 54 of voltage generating circuit J is discharged through the thyristor 208 and, thereby the negative voltage is applied to the base electrode of the transistor 51 through the diode 55. By the negative voltage the transistor 51 is made conductive and the voltage is applied to the phototransistor 59 of the first light receiving circuit L₁. In this case, the phototransistor 59 is positioned such that it can receive the flash light from the flash tube 28 of the flash tube circuit F and the light from another light source in the form of another flash device (not shown in the drawing). On the other hand, the solar cell 205 of the second light receiving circuit V is set such that it can not receive the flash light of the flash tube 28 of the flash tube circuit F. The capacitance value of the capacitor 207 is set such that the ON time duration of the thyristor 208 is larger than the flashing time duration of the another flash device. When the phototransistor 59 activates, an electric charge is stored on the integration capacitor 61 of the integrating circuit L$_2$ in response to the light quantity of another flash device to be measured.

As described foregoing, the charging voltage of the integration capacitor 61 is applied to the comparator circuit N and, at the same time, the reference voltages are also applied to the comparator circuit N from the reference voltage setting circuit M.

In this case, an actuating voltage of the comparator element 65a is set to such as, for example, 8 volts, an actuating voltage of the element 65b to 4 volts, an actuating voltage of the element 65c to 2 volts, and an actuating voltage of the element 65d is set to 1 volt. The setting voltages of the reference voltage setting circuit M are also set to the corresponding voltage of the comparator elements 66a–66d. When the charging voltage of the integrating capacitor 59 is 4 volts, the comparator elements 65b, 65c and 65d activate, since the electric charge is stored on the integrating capacitor 61 corresponding to the light quantity of the light from the another light source such as another flash device. The indication controlling circuits 67b–67d is operated by the output signals from the comparator circuit N, and thereby the indicating elements 66b–66d illuminate to indicate the light quantity of another light source. The indication controlling member 67b is set so as to operate when the light quantity corresponds to the diaphragm value F=5.6, the member 67c corresponds to the diaphragm value F=4, the member 67d corresponds to the diaphragm value F=2.8.

When the voltage signal of which value is 4 volts is supplied to the comparator 65, the comparator elements 65b–65d activate to illuminate the light emitting diodes 66b–66d. Under these conditions, output signal of the comparator element 55b is supplied to the quench controlling circuit G by way of the changeover switch 68, and thereby the thyristor 29 is made nonconductive. By turning off the thyristor 29, the flash tube 28 ceases flashing. When the reflected light quantity is minimal and the integrating value of the integration capacitor 61 is less than the diaphragm value F=5.6, the indication controlling circuits 67c and 67d activate to fire both of the light emitting diode 66c and 66d, or 67d activates to fire the only diode 66d. By the illuminating state of the light emitting diodes 66b–66d, the photographer can easily confirm that the quantity of the light of the another flash device did not attain to the light quantity which corresponds to the diaphragm value F=5.6, as well as can be confirmed the inadequate quantity of the light generated in the another flash device. In thus manner, when the inadequate light quantity with respect to the preselected value is detected, the photographer can make the camera-object distance small or adjust the diaphragm value of the camera in order to obtain the suitable light exposure.

When the reference voltage value of the reference voltage setting circuit M becomes lower than the voltage value of the integration capacitor 61, the comparator N operates to fail. Accordingly, the voltage of the integrating circuit L$_2$ is forcibly lowered by means of operating the integrating circuit L$_2$ after the predetermined time interval when the voltage signal is generated from the voltage generating circuit J. Further, when another light such as, for example, the sun light emits to the first light receiving circuit L$_1$, the charging voltage of the integration capacitor 61 becomes higher than the reference voltage of the reference voltage setting circuit M, the comparator circuit N operates erroneously. To prevent the error operation, the electric charge of the integration capacitor 61 is made zero by discharging the electric charge of the integration capacitor 61 to make the charging voltage of the integration capacitor 61 low by the operation of the integration resetting circuit K.

The actuation confirming and detecting circuit R operates when the voltage signal is supplied to the circuit R from the voltage generating circuit J. By the operation of the actuation confirming and detecting circuit R, the light emitting diode 80 is fired to be illuminated. When the only light emitting diode 80 illuminates and all of the other light emitting diodes 66a–66d do not illuminate, the photographer can confirm that the flash light of the another light source is the under exposure.

The timer circuit S is also operated by the voltage signal supplied from the voltage generating circuit J. When the timer circuit S is activated by the voltage signal from the voltage generating circuit J, the pulse signal is supplied from the timer circuit S to the illumination resetting circuit T, after the preset time of the timer circuit S such as 3 seconds. By the application of the pulse signal from the timer circuit S to the illumination resetting circuit T, the circuit T operates to short-circuit the electric power to be supplied to the light emitting diodes 66a–66d and 80, and thereby the illumination of the light emitting diodes 66a–66d and 80 are reset to be extinguished.

Although the four comparator elements are employed in the comparator circuit N in accordance with the above embodiments, the many number of comparator elements such as ten of the comparator elements can be employed in order to measure the quantity of light more accurately.

When the thyristor 81 becomes conductive, the negative voltage appears at the base electrode of the transistor 83, and the transistor 83 is made to turn on. When the transistor 83 becomes conductive, the voltage is applied to the programmable unijunction transistor 86. The movable contact 213a is connected to the stationary contact 213b of the changeover switch 213. In this condition, the charging voltage of the capacitor 85 is gradually increased to the predetermined value, and thereafter the programmable unijunction transistor 86 is made turned on after the some time interval such as three seconds. When the flash device of the present invention is located spaced at long distance from the other flash device in order to be employed as a flash meter, the movable contact 213a is connected to the stationary contact 213c of the changeover switch 213. In this case, the transistor 86 is made conductive after such as thirty seconds and therefore the light emitting diodes 66a–66d and 80 continue to illuminate, since the capacitance value of the capacitor 212 is set to be larger than that of the capacitor 85. When the light emitting diodes 66a–66d and 80 is required to flicker the three times during the thirty seconds, applied to the transistor 92 by way of the diode 100 and the capacitor 101 is the voltage signal generated at the moment of the ON-operation of the transistor 51 from the voltage generating circuit J in order to clarify the illuminations of the second times and the third times, and thereby the transistor 51 is momentary made conductive to extinguish the previous illumination of the light emitting diodes.

Although the emitting diodes are extinguished after the predetermined time interval in accordance with the above embodiment, it is possible, according to the present invention, to maintain the operation of the indicating member during given time interval and to keep the indicating member OFF state immediately before the next operation of the phototransistor 59. One of the method thereof is to apply the signal to the transistor 92 immediately before the phototransistor 59 operates by means of switching means or the like.

The electric charge of the capacitor 54 is discharged by way of the resistor 200, the switch 202 and the resistor 203 only when the thyristor is conductive, and thereby the transistor 51 is made conductive. Accordingly, the voltage is applied to the phototransistor 59 only when the thyristor 208 is conductive. To accomplish the above, the capacitance value is set to the given value so as not to be operated by the peripheral light. The voltage is continuously applied to the comparator circuit N so long as the power source switch 11 is ON state and thereby the error operation of the circuit N is prevented.

The timer circuit S and the timing setting circuit W can be omitted in order to simplify the circuit construction of the device. In this case, the switch 93 is made ON by means of the manual operation.

Although the solar cell is employed as the second light receiving element for the purpose of the reliability, a phototransistor may be used as the second light receiving element. Further, light shielding member may be disposed in the vicinity of the flash tube 28 in order to prevent being made conductive due to the flash light generated from the flash tube 28. Moreover, the voltage converter circuit B is not always required in case that a high voltage direct current power source (such as about 150 volts) is used as the battery 10 and thereby the circuit construction of the device can be simplified.

In accordance with the present invention, the following advnatages are obtained:

The device of the present invention can perform the confirmation of the automatic light exposure control and the confirmation of conditions of the light exposuring quantity of the device. Accordingly, the device is very convenient to alternate the photographing distance and to adjust the diaphragm of the camera.

Further, the present invention provides a very useful and economical flash device since the device in accordance with the present invention can be employed independently as a light measuring device for measuring the light of another light source such as another flash device in addition to an automatic light control function.

In view of above, it will be seen that the several objects of the invention are achieved and other advantageous results are attained.

While a preferred embodiment of the invention has been shown and described, it will be apparent to those skilled in the art modification can be made without departing from the object and the spirit of the invention, the scope of which is defined in the appended claims. Accordingly, the foregoing embodiment is to be considered illustrative, rather than restricting of the meaning and range of equivalency of the claims are to be included herein.

What is claimed is:

1. A light quantity indicating circuit for an electronic flash unit comprising means for boosting the voltage of a direct current power source and for storing electric energy, flash light generating means including a flash tube energized by said electric energy for generating a flash of light, trigger signal generating means for triggering said flash tube, flash stopping means for stopping the flash of said flash light generating means when the quantity of said flash of light attains a predetermined value, a first light receiving means for receiving reflected light which is produced from said flash tube and reflected from an object to be photographed, said receiving means generating a signal in response to the quantity of the received light, said stopping means being operative to terminate the energy supplied to said flash tube when said quantity reaches a predetermined level, gate means responsive to light emissions from said flash tube for enabling said first light receiving means during the flashing of said flash tube, detecting means for detecting the quantity of the light from said flash tube by comparing the voltage of an electric signal obtained by integrating said signal with a reference voltage, indicating means responsive to said detecting means for indicating a light quantity, and a second light receiving means for actuating said gate means in response to receiving light from a light source other than said flash tube whereby said first light receiving means activates such that said indicating means indicates the light quantity in the presence of other light sources.

2. A light quantity indicating circuit as claimed in claim 1, wherein said power supplying means further comprising a voltage converter circuit for boosting and converting an output voltage of said direct current power source to an alternating current voltage, a rectifier circuit for rectifying said alternating current voltage of said voltage converter circuit, and an electric energy storing circuit including a main storage capacitor for storing electric energy of the direct current voltage of said rectifier circuit as electric energy, and said flash stopping means comprises a quench controlling circuit having a switching circuit for turning off said flash tube, a quenching circuit for controlling said switching circuit, and a second trigger signal generating circuit for supplying a triggering signal to said quenching circuit.

3. A light quantity indicating circuit as claimed in claim 1, wherein said detecting means comprises a reference voltage setting circuit including a plurality of voltage dividing resistors, and a comparator circuit for receiving a plurality of reference voltages and charging voltage of an integration capacitor of said flash light quantity detecting means.

4. A light quantity indicating circuit as claimed in claim 1, wherein said indicating means comprises an indicating circuit which emits light in response to output signals of said comparator circuit.

5. A light quantity indicating circuit as claimed in claim 4, wherein said indicating means further comprises an indication controlling circuit for controlling said indicating circuit in response to the output signals of said comparator circuit.

6. A light quantity indicating circuit as claimed in claim 5, wherein said controlling circuit comprises a changeover switch connected to said comparator circuit and a quench controlling circuit connected to said changeover switch.

7. A light quantity indicating circuit as claimed in claim 1, wherein said converter means comprises a voltage generating circuit activated by operation of said trigger signal generating means.

8. A light quantity indicating circuit as claimed in claim 1 further including voltage generating means for generating a voltage signal, actuation retaining means for maintaining the operation of said indicating means, said retaining means comprising a timer circuit generating an OFF signal after a predetermined time interval at the time when the voltage generating means generates a voltage signal.

9. A light quantity indicating circuit as claimed in claim 1 further including an actuation confirming circuit for indicating the actuation of said flash tube.

10. A light quantity indicating circuit as claimed in claim 9, further comprising an indication resetting circuit for resetting an indicating circuit for indicating the flash light quantity of the flash tube.

11. A light quantity indicating circuit as claimed in claim 2, further comprising a trigger controlling circuit activating only when a neon glow lamp lights.

12. A light quantity indicating circuit as claimed in claim 1, further comprising means for making the voltage of an integrating circuit of said detecting means approximately zero by feeding back a flash stopping signal to said integrating circuit.

13. A light quantity indicating circuit as claimed in claim 1, wherein said second light receiving means includes a setting switch for setting the operation thereof, said receiving means being connected to the rectifier circuit, a switching element connected to said voltage generating circuit by way of said setting switch and a gate circuit including a gate capacitor connected to said rectifier circuit by way of said setting switch.

14. A light quantity indicating circuit as claimed in claim 1 further including actuation stopping means comprising a setting switch which sets the level at which said second light receiving means activates said gate means.

15. A light quantity indicating circuit as claimed in claim 8, wherein said actuation retaining means comprises a timer circuit including a switching element which is turned on by a voltage signal generated from said voltage generating circuit, and a timing changeover circuit for changing the time constant of said timer circuit.

16. A light quantity indicating circuit as claimed in claim 15, wherein said timer circuit includes a programmable unijunction transistor.

17. A light quantity indicating circuit as claimed in claim 16, wherein said timing changeover circuit comprises a plurality of integration circuits and a time constant changeover switch for changing the time constant of said timer circuit connected to said plurality of integration circuits.

* * * * *